US006883668B1

(12) United States Patent
Lindsey et al.

(10) Patent No.: US 6,883,668 B1
(45) Date of Patent: Apr. 26, 2005

(54) METHOD OF AUTOMATIC DEBRIS SEPARATION

(75) Inventors: James A. Lindsey, Florence, SC (US); Daniel A. Allen, Jr., Florence, SC (US); Jonathan W. Skelley, Florence, SC (US)

(73) Assignee: Wellman, Inc., Shrewsbury, NJ (US)

( * ) Notice: Subject to any disclaimer, the term of this patent is extended or adjusted under 35 U.S.C. 154(b) by 107 days.

(21) Appl. No.: 10/365,015

(22) Filed: Feb. 12, 2003

(51) Int. Cl.[7] .................................................. B03B 1/00
(52) U.S. Cl. ..................... 209/132; 209/133; 209/138; 209/139.1; 209/154
(58) Field of Search .............................. 209/132, 133, 209/138, 139.1, 154, 231, 232

(56) References Cited

U.S. PATENT DOCUMENTS

| | | | |
|---|---|---|---|
| 4,127,476 A | | 11/1978 | Iannazzi |
| 4,344,843 A | * | 8/1982 | Leifeld ........................ 209/143 |
| 4,431,530 A | * | 2/1984 | Syben ......................... 209/138 |
| 4,634,522 A | * | 1/1987 | Edholm et al. ............. 209/154 |
| 4,853,112 A | * | 8/1989 | Brown ........................ 209/142 |
| 5,281,278 A | | 1/1994 | Stein |
| 5,289,921 A | | 3/1994 | Rodrigo et al. |
| 5,351,832 A | * | 10/1994 | Abbott et al. ............ 209/139.1 |
| 5,366,094 A | | 11/1994 | Stein |
| 5,409,118 A | | 4/1995 | Bielagus et al. |
| 5,411,142 A | | 5/1995 | Abbott et al. |
| 5,497,949 A | * | 3/1996 | Sharer .......................... 241/76 |
| 5,518,188 A | | 5/1996 | Sharer |
| 5,535,945 A | * | 7/1996 | Sferrazza et al. ......... 241/24.12 |
| 5,598,980 A | * | 2/1997 | Dilly-Louis et al. .......... 241/20 |
| 5,722,603 A | * | 3/1998 | Costello et al. ............... 241/20 |
| 5,975,309 A | | 11/1999 | Mitsuda et al. |
| 6,250,575 B1 | * | 6/2001 | White .......................... 241/76 |
| 6,752,336 B1 | * | 6/2004 | Wingard ....................... 241/20 |
| 2001/0032806 A1 | | 10/2001 | Flores |

FOREIGN PATENT DOCUMENTS

| | | |
|---|---|---|
| GB | 2 157 198 A | 10/1985 |
| JP | 2002018849 A | 1/2002 |

OTHER PUBLICATIONS

Forsberg, Inc., *Pneumatic Aspirators*, product literature (undated), Forsberg, Inc., 1 page, Thief River Falls, Minnesota.

American International MFG., *Cascade Pneumatic Separator*, product literature (undated), 1 page, American International Mfg., Woodland, California.

American International MFG., 10 Series Airleg *Pneumatic Separator*, product literature (undated), 2 pages, American International Mfg., Woodland, California.

Global Equipment Marketing Inc., Magnetics Division, *Eddy Current Non–Ferrous Separators*, product literature (undated), 2 pages, Global Equipment Marketing, Inc.

* cited by examiner

*Primary Examiner*—Donald P. Walsh
*Assistant Examiner*—Jonathan R Miller
(74) *Attorney, Agent, or Firm*—Summa & Allan, P.A.

(57) ABSTRACT

The invention is an automatic debris separation process for effecting air separation of fragmented materials, such as size-reduced fiber feedstocks derived from textile wastes. The process uses high-velocity air within an elutriation assembly to efficiently remove ferrous and non-ferrous metal debris from recyclable polymer fibers. In particular, the process may employ automatic process control strategies to vary airflow within the elutriation assembly in process-controlled response to measured metal contamination, thereby ensuring that post-separation metal contamination is maintained at or below an upper contamination limit.

38 Claims, 1 Drawing Sheet

METHOD OF AUTOMATIC DEBRIS SEPARATION

CROSS-REFERENCE TO RELATED APPLICATION

This application is related to commonly-assigned, concurrently-filed application Ser. No. 10/364,946 for an *Automatic Debris Separation System,* which is hereby incorporated entirely herein by reference.

BACKGROUND OF THE INVENTION

The invention relates to the efficient and cost-effective recovery of component materials from an unsorted or contaminated feedstock. The invention is especially useful for recovering polymeric material by removing metal debris from polymer fiber feedstocks, such as from textile wastes.

Textile manufacturers and suppliers are continually challenged by the generation of textile waste, such as waste carpet. Each year, large quantities of textile wastes are simply landfilled. Disposing of textile wastes in this way is not only expensive, but also runs counter to increasing corporate emphasis on environmental stewardship. In short, merely discarding textile wastes precludes the recovery of useful component materials.

The presence of tramp metal debris in textile wastes complicates recycling efforts. Coarse metal debris can damage recycling equipment and so must be removed. This reduces recycling efficiency, frequently rendering recovery of the desired components too costly to be practical.

Current processes for recovering textile waste components often require complicated and expensive integration of numerous unit operations, and yet achieve modest results. For example, typical processes employ magnets to remove tramp metal debris from textile wastes. In some processes, this requires frequent process stoppages so that metal debris can be removed by hand. In other processes, the magnets have auto-clean mechanisms, but this often comprises performance.

In addition, magnets effectively capture only ferrous metals. Thus, some metal detectors employ integrated debris rejection devices that work on non-ferrous metal. Such detector-rejection devices, however, are not only expensive, but also complicated—establishing and maintaining a target sensitivity is difficult. Moreover, because recyclable materials (i.e., polymer fibers) become carryover losses with each detection-rejection sequence, the size threshold that triggers detection must be set to limit product yield loss.

A need continues to exist for an efficient and cost-effective system for separating and recovering the components of polymer fiber wastes such that the recovered materials are sufficiently uncontaminated to facilitate immediate recycling. In particular, there is a need for a system to remove metal debris from all kinds of textile wastes, including waste carpet.

SUMMARY OF THE INVENTION

Therefore, it is an object of the present invention to provide an efficient system and process for recovering component materials from a contaminated feedstock.

It is further an object of the present invention to provide an air classifier system and process for recovering polymer fibers from a size-reduced textile feedstock.

It is further an object of the present invention to provide an air classifier system and process that employs automatic process control schemes to ensure that post-separation contamination is maintained at or below an upper contamination limit.

It is further an object of the present invention to provide an air classifier system and process that manipulates airflow within an elutriation assembly in process-controlled response to measured metal contamination to ensure that post-separation metal contamination is maintained at or below an upper contamination limit.

It is further an object of the present invention to provide an air classifier system and process that employs high-velocity air to separate feedstock components.

It is further an object of the present invention to provide an air classifier system and process for recovering polymer fibers from a contaminated polymer fiber feedstock to facilitate direct processing of the recovered polymer fibers.

It is further an object of the present invention to lessen the environmental impact of disposing of textile wastes in landfills by providing an economically viable recycling method.

The foregoing, as well as other objectives and advantages of the invention and the manner in which the same are accomplished, in is further specified within the following detailed description and its accompanying drawing.

DETAILED DESCRIPTION OF THE INVENTION

Figure 1:
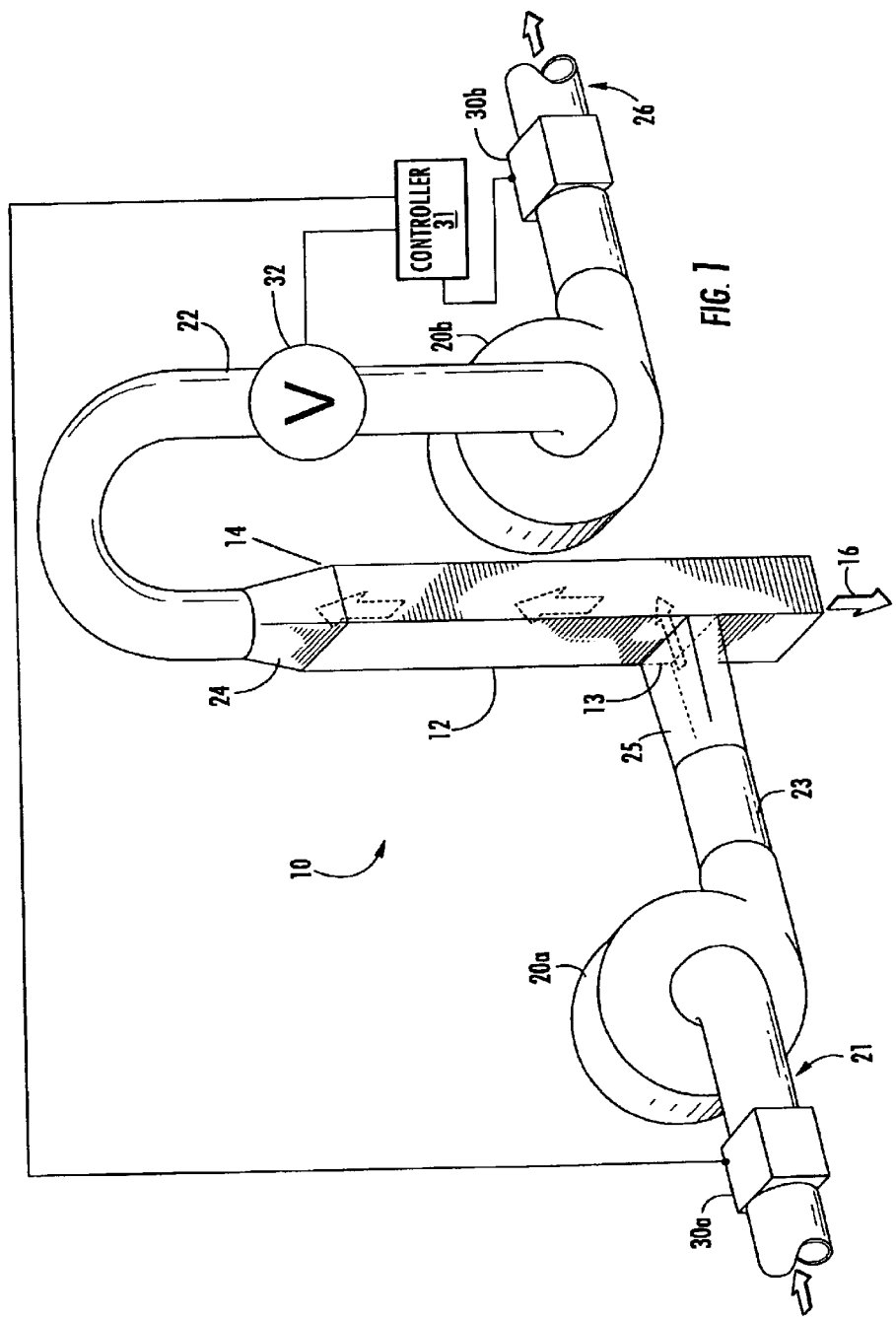
FIG. 1 schematically depicts one configuration of the automatic debris separation system.

The present invention is an automatic debris separation system and process for effecting density separation of fragmented materials. This automatic debris separation system is especially well-suited for removing metal debris from intermediate polymer feedstocks, such as those resulting from the reclamation of carpet, yarns, and other textile wastes. Such feedstocks typically include metal debris that must be removed to preclude process upsets during polymer reclamation operations.

The automatic debris separation system efficiently removes metal contaminants (e.g., wire, staples, rivets, tacks, or baling wire and bands) from reusable polymer fibers (e.g., polyester and nylon). Among other uses, the recovered polymer fibers may be melt-extruded and pelletized, or formed into filament, such as via melt-spinning. Pelletized polyester and nylon are especially useful for engineering plastics or resins. In this regard, metal debris is an unacceptable defect in most engineering resins as it can obstruct die-mold gates.

The automatic debris separation system introduces a fragmented (e.g., size-reduced) material feedstock, such as a polymer fiber feedstock derived from shredded carpet or other textiles (e.g., tow bands), into an elutriation assembly via a high-velocity air stream. The upward airflow within the elutriation assembly is sufficient to lift the feedstock's lighter materials through the top of the elutriation assembly. The denser debris, however, drops through the bottom of the elutriation assembly. In this way, metal debris may be removed from a polymer fiber feedstock. The automatic debris separation system, while effective at removing metal contaminants from a fragmented feedstock, is not limited to removing metal—other kinds of contamination monitoring devices can be effectively employed. Moreover, additional elutriation assemblies may be used in series to achieve additional separation.

Those having ordinary skill in the art will appreciate that while a preferred embodiment of the automatic debris separation system recovers polymer fibers, it may be desirable to recover denser materials from a contaminated, fragmented feedstock. Recovery of a light fraction, a heavy fraction, or both is within the scope of the invention. Accordingly, as used herein, the term "post-separation contamination" can refer to residual contamination in either the light fraction or the heavy fraction, after the feedstock has been subjected to air classification.

The automatic debris separation system preferably employs automatic process control strategies to ensure that residual metal contamination is maintained at or below an upper contamination limit. The air classifier system preferably employs a controller that receives input signals from a metal detector and sends control signals to a control element, such as a controllable bleed valve, to manipulate air velocity within the elutriation assembly and thereby maintain the residual metal contamination in the recovered materials at or below a desired set point.

Residual metal contamination should be maintained "at or below" a desired set point because the air classifier system may have a maximum airflow—or maximum air velocity. Particularly where the incoming feedstock has negligible contamination, attempting to maintain the residual metal contamination in the light fraction precisely at a set point could require excessive and undesirable—if not unachievable—airflow within the elutriator.

Those having ordinary skill in the art will appreciate that the concept of maintaining a controlled variable at a set point embraces temporary deviations from that set point. For example, that residual metal contamination may exceed its set point from time to time does not imply any failure to maintain residual metal contamination at or below a desired set point.

Those having ordinary skill in the art will further appreciate that decreasing air velocity within the elutriation assembly decreases material throughput and increases heavy fraction (e.g., metal) removal and, conversely, that increasing air velocity within the elutriation assembly increases material throughput and decreases heavy fraction (e.g., metal) removal.

To illustrate, and without being bound by any theory, it is thought that metal debris drops from the elutriation assembly when the air velocity ($V_A$) within the elutriation assembly falls below the critical velocity ($V_{CEM}$) of the metal debris, (i.e., $V_A < V_{CrM}$). Provided the airflow is sufficient, polymer fibers, which are significantly lighter than metal debris, are carried upwardly though the elutriation assembly even though the air velocity within the elutriation assembly is less than the critical velocity of the metal debris (i.e., $V_A < V_{CrM}$). In brief, the airflow within the elutriation assembly is adjusted to make certain that metal debris sinks and polymer fibers float.

A better understanding of the automatic debris separation system may be achieved by reference to FIG. 1. The air classifier system 10 employs an elutriation assembly, which itself includes a separation chamber 12 having a material inlet 13, a light-fraction material outlet 14, and a heavy-fraction material outlet 16. The separation chamber 12, which is typically an extended cylinder or rectangular duct, is substantially vertical. That is, the separation chamber 12 is oriented primarily upright.

The air classifier system 10 further includes one or more fans 20 for transporting a fragmented material feedstock into and through the separation chamber 12. To facilitate process responsiveness and reduce equipment wear and tear, the one or more fans 20 preferably operate at substantially constant speeds (i.e., RPMs).

In a typical configuration of the air classifier system 10, a feed fan 20a is in communication with (i.e., connected to) the material inlet 13 of the separation chamber 12 via a feedstock conduit 23, and a separation fan 20b is in communication with (i.e., connected to) the light-fraction material outlet 14 of the separation chamber 12 via a light-fraction conduit 22. The feedstock passes through the feed fan 20a before elutriation and through the separation fan 20b after elutriation. Stated otherwise, feedstock conduit 23 is connected to the discharge side of the feed fan 20a and the light-fraction conduit 22 is connected to the intake side of the separation fan 20b.

The feedstock conduit 23 may include a feed nozzle 25 at the material inlet 13 of the separation chamber 12. The feed nozzle 25 somewhat decreases the air stream velocity at the separation chamber 12. Similarly, the light-fraction conduit 22 may include a hood 24 at the light-fraction material outlet 14 of the separation chamber 12. The hood 24 smoothly but quickly increases air stream velocity from the separation chamber 12 to the light-fraction conduit 22, thereby improving material discharge from the separation chamber 12.

The air classifier system 10 preferably employs automatic process control strategies to ensure that residual contamination in the recovered material is maintained at or below an upper contamination limit. More specifically, the air classifier system 10 preferably includes at least one metal detector 30, which assesses either pre-separation metal contamination or post-separation metal contamination, in automatic process control communication with means for manipulating air velocity within the separation chamber 12.

Metal detectors that detect and measure ferrous and/or non-ferrous metals are known to those having ordinary skill in the art. The preferred metal detectors 30 used in the automatic debris separation system are capable of sensing both ferrous and non-ferrous metals. Various metal detectors are available from Bunting Magnetics Co. of Newton, Kans.

In a representative feedback control scheme, an upwardly flowing air stream within the separation chamber 12 separates the material feedstock into a light fraction, which exits the separation chamber 12 through the light-fraction material outlet 14, and a heavy fraction, which exits the separation chamber 12 though the heavy-fraction material outlet 16. A metal detector 30b, located on the outlet transport line 26, measures the residual metal contamination in the light fraction and transmits, to a controller 31, measurement signals indicating the metal contamination in the light fraction. (Alternatively, the metal detector 30b may be located, for example, on the light-fraction conduit 22 or in the separation chamber 12, near the light-fraction material outlet 14.) The controller 31 compares the measured metal contamination in the light fraction with a set point and decides how to adjust the control element (e.g., a controllable bleed valve 32) so as to maintain the metal contamination in the light fraction at or below the set point. Thus, the residual metal contamination in the light fraction is the controlled variable. The controller 31 then transmits control signals to the control element, which, in process-controlled response to the control signals, adjusts the air velocity within the separation chamber 12. Thus, air velocity is the manipulated variable.

Similarly, in a representative feed forward control scheme, the metal detector 30a, located on the inlet transport line 21, measures pre-separation metal contamination in the material feedstock and transmits, to a controller 31 measurement signals indicating the metal contamination in the incoming material. The controller 31 decides how to adjust the control element (e.g., the controllable bleed valve 32) so as to maintain the residual metal contamination in the light fraction at acceptable levels. The controller 31 then transmits control signals to the control element, which, in process-controlled response to the control signals, adjusts the air velocity within the separation chamber 12.

As will be appreciated by those of ordinary skill in the art, the feedback control scheme is effective because the automatic process control system responds whenever the post-separation metal contamination exceeds its set point. In an automatic process control system that employs only feedback control, the post-separation metal contamination must actually deviate from its desired set point before the controller 31 signals the control element (e.g., the controllable bleed valve 32) to manipulate the air velocity within the separation chamber 12.

A feed forward control scheme, however, measures disturbances before elutriation (e.g., metal contamination in the incoming feedstock) and manipulates the air velocity within the separation chamber 12 before the post-separation metal contamination exceeds its set point. Those of ordinary skill in the art will recognize that feed forward control is preferably employed in conjunction with some feedback control to ensure that the process control system can respond to disturbances besides contamination in the incoming feedstock.

For example, a preferred embodiment of the invention includes both feed forward and feedback control loops, which employ distinct contamination detectors (e.g., metal detectors 30a and 30b) to monitor both pre-separation contamination and post-separation contamination. Those having ordinary skill in the art will recognize that only one controller 31 is typically necessary even where the air classifier system 10 uses more than one contamination detector.

As noted, a light fraction (e.g., polymer fibers) is the preferred recovered component. Nonetheless, the automatic debris separation system may be employed such that the heavy fraction (e.g., ferrous and non-ferrous metals) is the recovered component. For example, wire may be recovered from its plastic sheath insulation.

Though monitoring residual contamination of the recovered component facilitates feedback control, monitoring the non-recovered stream, too, may be desirable. Monitoring both the light fraction and the heavy fraction can help ensure that losses of the recoverable component are not excessive. For example, where metal (heavy fraction) is the recovered component, measuring metal concentration in the light fraction provides information regarding separation efficiency. This can be used to analyze and adjust the system parameters to improve recovery efficiency.

As noted, the air classifier system 10 includes a contamination detector in automatic process control communication with means for manipulating air velocity within the separation chamber 12. Such air regulator means typically includes a controller 31 and a control element. The control element preferably is a device that can adjust air velocity within the separation chamber 12 (e.g., a bleeder inlet valve, a fan speed governor, or a mechanism for changing the cross-section of the separation chamber 12).

The preferred control element, however, is a controllable bleed valve 32, especially where the air classifier system 10 employs one or more fans 20 running at substantially constant speeds. The controllable bleed valve 32 is preferably positioned at the light-fraction conduit 22 (i.e., before the separation fan 20b). Employing a controllable bleed valve 32 enables the automatic debris separation system to provide excellent responsiveness to both pre-separation and post-separation disruptions, while permitting the fans 20 to maintain constant speeds.

For example, where the metal detector 30b is communication with the controllable bleed valve 32 via a feedback process control loop, the metal detector 30b measures the residual metal contamination in the light fraction after elutriation (e.g., recovered polymer fibers) and compares that measurement to a set point. If the residual metal contamination exceeds the set point, the control loop instructs the controllable bleed valve 32 to open. This causes the separation fan 20b to draw in outside air, thereby reducing the airflow (and air velocity) within the separation chamber 12. Decreasing air velocity within the elutriation assembly decreases material throughput and increase metal removal.

Optionally, if the metal contamination falls below the set point, the control loop instructs the controllable bleed valve 32 to close, thereby increasing the airflow (and air velocity) within the separation chamber 12. This increases system throughput. In this way, a steady state process for removing metal debris from a polymer fiber feedstock can be achieved.

Similarly, where the metal detector 30a is in communication with the controllable bleed valve 32 via a feed forward process control loop, the metal detector 30a measures the metal contamination in the incoming feedstock (e.g., a polymer fiber feedstock) before elutriation and compares that measurement to a set point. Referring to FIG. 1, the metal detector 30a is typically positioned before the nozzle 25, either on the inlet transport line 21 (as shown) or on the feedstock conduit 23). If the metal contamination within the incoming feedstock exceeds expectations, the controller 31 instructs the controllable bleed valve 32 to open, thereby reducing the airflow (and air velocity) within the vertical separation chamber 12. As noted, decreasing air velocity within the elutriation assembly decreases material throughput and increases metal removal.

Optionally, if the metal contamination in the incoming feedstock is less than expected, the controller 31 instructs the controllable bleed valve 32 to close, thereby increasing the airflow (and air velocity) within the separation chamber 12. Increasing airflow velocity may be desirable, for instance, to recover polymer fibers that would otherwise be discharged with the metal debris from the heavy-fraction material outlet 16.

In one embodiment, the automatic debris separation system is an air classifier system 10 that includes a separation chamber 12 having a material inlet 13, a light-fraction material outlet 14, and a heavy-fraction material outlet 16. The air classifier system 10 further includes air conveyance means (e.g., piping and one or more fans, blowers, or compressors) for transporting material into and through the separation chamber 12, air regulator means for manipulating air velocity within the separation chamber 12, and a contamination detector for assessing material contamination, such as metal contamination. The contamination detector is in automatic process control communication with the air regulator means.

In another embodiment, the automatic debris separation system is an air classifier 10 system that includes a separation chamber 12 having a material inlet 13, a light-fraction material outlet 14, and a heavy-fraction material outlet 16.

The air classifier system 10 further includes a feed fan 20a that is in communication with (i.e., connected to) the material inlet 13 of the separation chamber 12 via a feedstock conduit 23, and a separation fan 20b that is in communication with (i.e., connected to) the light-fraction material outlet 14 of the separation chamber 12 via a light-fraction conduit 22. The air classifier system 10 also employs a controller 31 that receives input signals from a metal detector 30 and sends control signals to a controllable bleed valve 32, which is positioned at the light-fraction conduit 22. The metal detector 30 may be positioned to measure either pre-separation or post-separation metal contamination, such as at the light-fraction conduit 22. Moreover, the metal detector 30 may be in communication with the controllable bleed valve 32 via a feedback control scheme or a feed forward control scheme to maintain post-separation metal contamination at or below the desired set point.

It will be understood by those of ordinary skill in the art that where a consistent feedstock is available, the elutriation process parameters need not be continually adjusted. Accordingly, the need to implement automatic process control is diminished. Even in such favorable circumstances, however, additional aspects of the present air classifier system 10 (e.g., increased air velocities) improve the removal of metal debris from a polymer fiber feedstock.

In contrast to typical commercial elutriation systems, the separation chamber 12 possesses a relatively narrow cross-section, which facilitates precise control of the desired separation criteria and optimal debris removal. This may be expressed by ratios of the cross-sectional area of the separation chamber 12 to that of the incoming feedstock conduit 23, the outgoing light-fraction conduit 22, or both. To ensure consistent assessment of such ratios, it is again noted that the feedstock conduit 23 connects the feed fan 20a to the separation chamber 12, and the light-fraction conduit 22 connects the separation chamber 12 to the separation fan 20b.

More specifically, the relationships between the separation chamber 12 and the incoming feedstock conduit 23 and/or the outgoing light-fraction conduit 22 can be described in reference to minimum, maximum, and average cross-sectional areas (e.g., via ratios). In this regard, those of ordinary skill in the art will know that the volume divided by length defines average cross-sectional area.

In one aspect of the automatic debris separation system, the average cross-sectional area of the separation chamber 12 (i) is less than about twenty times the average cross-sectional area of the feedstock conduit 21 and/or (ii) is less than about twenty times the average cross-sectional area of the light-fraction conduit 22. Preferably, the maximum cross-sectional area of the separation chamber 12 (i) is less than about twenty times the minimum cross-sectional area of the feedstock conduit 23 and/or (ii) is less than about twenty times the minimum cross-sectional area of the light-fraction conduit 22.

In another aspect of the automatic debris separation system, the average cross-sectional area of the separation chamber 12 (i) is less than about fifteen times the average cross-sectional area of the feedstock conduit 23 and/or (ii) is less than about fifteen times the average cross-sectional area of the light-fraction conduit 22. Preferably, the maximum cross-sectional area of the separation chamber 12 (i) is less than about fifteen times the minimum cross-sectional area of the feedstock conduit 23 and/or (ii) is less than about fifteen times the minimum cross-sectional area of the light-fraction conduit 22.

In yet another aspect of the automatic debris separation system, the average cross-sectional area of the separation chamber 12 (i) is less than about ten times the average cross-sectional area of the feedstock conduit 23 and/or (ii) is less than about ten times the average cross-sectional area of the light-fraction conduit 22. Preferably, the maximum cross-sectional area of the separation chamber 12 (i) is less than about ten times the minimum cross-sectional area of the feedstock conduit 23 and/or (ii) is less than about ten times the minimum cross-sectional area of the light-fraction conduit 22.

In yet another aspect of the automatic debris separation system, the average cross-sectional area of the separation chamber 12 (i) is less than about five times the average cross-sectional area of the feedstock conduit 23 and/or (ii) is less than about five times the average cross-sectional area of the light-fraction conduit 22. Preferably, the maximum cross-sectional area of the separation chamber 12 (i) is less than about five times the minimum cross-sectional area of the feedstock conduit 23 and/or (ii) is less than about five times the minimum cross-sectional area of the light-fraction conduit 22.

In yet another aspect of the automatic debris separation system, the average cross-sectional area of the separation chamber 12 (i) is less than about three times the average cross-sectional area of the feedstock conduit 23 and/or (ii) is less than about three times the average cross-sectional area of the light-fraction conduit 22. Indeed, the maximum cross-sectional area of the separation chamber 12 (i) may be less than about three times the minimum cross-sectional area of the feedstock conduit 23 or (ii) may be less than about three times the minimum cross-sectional area of the light-fraction conduit 22.

As used herein, when describing the ratio of cross-sectional area of the separation chamber to the cross-sectional area of the feedstock conduit 23 or the cross-sectional area of the light-fraction conduit 22, the conjunction "or" is used to embrace one or both alternatives.

A prototype air classifier 10 according to the present invention employs a uniform separation chamber 12 (26-inch by 14-inch) having a cross-sectional area of about 2.5 square feet. In contrast, a conventional elutriator of similar throughput capacity might have a cross-sectional area of nearly seven square feet of more.

In one configuration, the feedstock conduit 23 is formed of a six-inch pipe, which has a cross-sectional area of about 0.20 square feet, and the light-fraction conduit 22 is formed of a seven-inch pipe, which has a cross-sectional area of about 0.27 square feet. Consequently, the ratio of the cross-sectional area of the separation chamber 12 to that of the incoming feedstock conduit 23 is less than 13 and the ratio of the cross-sectional area of the separation chamber 12 to that of the outgoing light-fraction conduit 22 is less than 10. These ratios are believed to be lower than those describing conventional elutriation systems, where ratios greater than 25 are typical.

In another configuration, the feedstock conduit 23 is formed of a 16-inch pipe, which has a cross-sectional area of about 1.4 square feet, and the light-fraction conduit 22 is formed of a 12-inch pipe, which has a cross-sectional area of about 0.79 square feet. Consequently, the ratio of the cross-sectional area of the separation chamber 12 to that of the incoming feedstock conduit 23 is about than 1.8 and the ratio of the cross-sectional area of the separation chamber 12 to that of the outgoing light-fraction conduit 22 is about 3.2. These ratios are believed to be substantially lower than those describing conventional elutriation systems.

In the latter configuration, the air classifier system 10 removed between 91 and 100 percent of larger debris (i.e., screened by move than a 0.25-inch screen) and between about 82 and 92 percent of smaller debris (i.e., screened by more than 0.093-inch screen but less than a 0.25-inch screen). Moreover, this configuration of the air classifier system 10 removed up to about half of the fines (i.e., screened by less than a 0.093-inch screen).

Those of ordinary skill in the art will appreciate that where the separation chamber 12 is uniform (i.e., has a constant cross-sectional area), its maximum cross-sectional area is equivalent to its average cross-sectional area. Likewise, where the feedstock conduit 23 and light-fraction conduit 22 have constant cross-sectional area, their respective minimum cross-sectional areas are equivalent to their respective average cross-sectional area. Though the feedstock conduit 23 and light-fraction conduit 22 typically consist of conventional piping having fixed constant cross-sectional areas, the profile of the separation chamber 12 may be varied to improve elutriation. Air stream velocity will increase, of course, as cross-sectional area decreases.

Within the separation chamber 12, the air stream typically has an average velocity of more than 500 feet per minute. Depending on the densities of the light fraction and the heavy fraction, average air stream velocities of more than 1,000 feet per minute and even 2,000 feet per minute may be employed within the separation chamber 12. For removing metal debris (e.g., staples or baling wire) from polymer fiber feedstocks, the air stream preferably has an average velocity of between about 1,000 and 3,000 feet per minute within the separation chamber 12. Most commercial elutriators employ air velocities that are substantially lower than 500 feet per minute. See e.g., U.S. Pat. Nos. 5,351,832 and 5,411,142 (Abbott et al.).

As used herein, average velocity refers to the mean velocity for any period in which a feedstock is directed through the separation clamber 12 via an air stream.

In other embodiments, the invention is an air classifier system 10 that includes a substantially vertical separation chamber 12 having a material inlet 13, a light-fraction material outlet 14, and a heavy-fraction material outlet 16. The air classifier system 10 further includes a feed fan 20*a* connected to the material inlet 13 of the separation chamber 12 via a feedstock conduit 23, and a separation fan 20*b* connected to the light-fraction material outlet 14 of the separation chamber 12 via a light-fraction conduit 22. The feed fan 20*a* and the separation fan 20*b* together produce average air velocities of more than 500 feet per minute within the separation chamber 12. In addition, the maximum cross-sectional area of the separation chamber 12 (i) is less than fifteen times the average cross-sectional area of the feedstock conduit 23 and (ii) is less than fifteen times the average cross-sectional area of the light-fraction conduit Preferably, the maximum cross-sectional area of the separation chamber 12 (i) is less than ten times the minimum cross-sectional area of the feedstock conduit 23 or (ii) is less than ten times the minimum cross-sectional area of the light-fraction conduit 22.

More preferably, the maximum cross-sectional area of the separation chamber 12 (i) is less than five times the average cross-sectional area of the feedstock conduit 23 and (ii) is less than five times the average cross-sectional area of the light-fraction conduit 22. In this regard, the maximum cross-sectional area of the separation chamber 12 (i) may be less than three times the average cross-sectional area of the feedstock conduit 23 or (ii) may be less than three times the average cross-sectional area of the light-fraction conduit 22.

These embodiments are useful where a stable feedstock is readily available and there is minimal need for automatic process control systems.

As noted, fiber tows are a suitable textile feedstock. The fiber tows are usually baled with metal bands, which can contaminate the light fraction fibers. Before elutriation, the fibers in the tow are typically cut into lengths of four inches or less. Thereafter screening using a 3-inch or smaller screen-preferably about a 1.5-inch screen—yields a suitable material feedstock. Those having ordinary skill in the art will appreciate that fibers of a foot or more (i.e., "stringers") will occasionally pass through the screens. Nonetheless, the air classifier system 10 effectively handles these longer fibers.

Another suitable textile feedstock is carpet waste, which is often contaminated with metal debris (e.g., paperclips, staples, and tacks). Carpet waste is typically available in rolls or otherwise oversized scraps. The automatic debris separation system, however, employs air classification, which requires a fragmented feedstock. Consequently, the carpet waste is subjected to a mechanical size-reduction process to break down the carpet into its fibrous components (e.g., face fibers and olefin backing fibers).

Size reduction may be effected by first shredding (e.g., ripping in a shredder) and, optionally, thereafter granulating the shredded carpet waste. Carpet shredding may employ any conventional shredding equipment that can rip the carpet waste into coarse carpet scraps. Such carpet scraps are screened to ensure that the target size reduction is achieved. A 3-inch or smaller screen—preferably about a 1.5-inch screen—that is integrated into a shredder yields a suitable material feedstock.

If necessary, the subsequent granulating of the shredded carpet is preferably achieved by subjecting it to a rotating blade granulator, which is characterized by rotating knives that integrate with stationary bed knives. Those having ordinary skill in the art will be familiar with additional means to disintegrate the carpet waste into fibrous components, and such means are within the scope of the invention. See Perry and Green, Perry's *Chemical Engineers' Handbook* § 20 (7th ed. 1997). Carpet size-reduction, which is a dry process, may be either a batch or continuous process.

In accordance with the foregoing, there are preferred methods of practicing the invention. In one such embodiment, the fragmented material feedstock is introduced into a substantially vertical separation chamber 12 having an upper light-fraction material outlet 14 and a lower heavy-fraction material outlet 16. An upward airflow is directed within the separation chamber 12 to separate the material feedstock into a light fraction and a heavy fraction, whereby the light fraction exits the separation chamber 12 though the light-fraction material outlet 14 and the heavy fraction exits the separation chamber 12 though the heavy-fraction material outlet 16. The material contamination, whether post-separation or pre-separation, is continually assessed and, in process-controlled response to this material contamination, the airflow within the separation chamber 12 is continually adjusted.

Another preferred embodiment, which relates to the removal of metal contaminants from a fiber feedstock, includes continually introducing a fiber feedstock into a separation chamber 12 via an air stream that has an average velocity more than 500 feet per minute within the separation chamber 12. The fiber feedstock is thereby continually separated into (i) a light fraction that exits the separation chamber 12 though its light-fraction material outlet 14 and (ii) a heavy fraction that exits the separation chamber 12 though its heavy-fraction material outlet 16. The method further includes measuring metal contamination and manipulating the air stream velocity within the separation chamber 12 in response to the measured metal contamination. The fiber feedstock can include manufactured materials (e.g., polyester, nylon, acrylic, and/or polyethylene fibers) and/or natural materials (e.g., wool, silk, or cotton and/or fibers).

Yet another preferred embodiment, which likewise relates to the removal of metal contaminants from a polymer fiber feedstock, includes continuously introducing a polymer fiber feedstock into a separation chamber 12 via an air stream that has an average velocity more than 500 feet per minute within the separation chamber 12. Doing so continuously separates the polymer fiber feedstock into (i) a light fraction that exits the separation chamber 12 though its light-fraction material outlet 14 and (ii) a heavy fraction that exits the separation chamber 12 though its heavy-fraction material outlet 16. (The heavy fraction is typically metal debris.) The method further includes continually measuring metal contamination in the light fraction; transmitting, to a controller 31, measurement signals indicating the metal contamination in the light fraction; transmitting, from the controller 31, control signals to a control element (e.g., the controllable bleed valve 32) that manipulates air velocity within the separation chamber 12; and continually manipulating the air stream velocity within the separation chamber 12 in process-controlled response to the control signals. (As noted, the controller 31 compares the measured metal contamination in the light fraction with a set point and decides how to adjust the control element so as to maintain the metal contamination in the light fraction at or below the set point.) This embodiment can further include continually measuring metal contamination in the polymer fiber feedstock and transmitting, to the controller 31, disturbance signals indicating metal contamination changes in the polymer fiber feedstock.

With respect to these preferred process embodiments, the term "continuously" is used in its conventional sense to convey constant activity while the air classifier system is in use. The term "continually," however, is used to mean repeatedly, though not necessarily continuously. Accordingly, as used herein the term "continuously" is a subset of the term "continually."

For example, the phrase "continuously measuring metal contamination" is intended to convey to those having ordinary skill in the art that the measurement of metal contamination is more than recurrent (i.e., essentially constant) while the air classifier system is in use. In contrast, the phrase "continually measuring metal contamination" is intended to convey to those having ordinary skill in the art that the measurement of metal contamination is at least recurrent (and possibly continuous), but more than sporadic, while the air classifier system is in use. The concept of "continually measuring" would embrace, for example, repeated measurements once every 30 seconds.

In the specification and drawing typical embodiments of the invention have been disclosed. Specific terms have been used only in a generic and descriptive sense, and not for purpose of limitation. The scope of the invention is set forth in the following claims.

What is claimed is:

1. A separation method employing a closed-loop automatic process control system, comprising:
    introducing a material, feedstock into a substantially vertical separation chamber having an upper light-fraction material outlet and a lower heavy-fraction material outlet, the material feedstock comprising a fragmented textile feedstock;
    directing an upward airflow within the separation chamber to separate the material feedstock into a light fraction and a heavy fraction such that the light fraction exits the separation chamber though the light-fraction material outlet and the heavy fraction exits the separation chamber though the heavy-fraction material outlet;
    continually assessing material contamination; and
    continually adjusting the airflow within the separation chamber in process-controlled response to the material contamination.

2. A method according to claim 1, wherein the fragmented textile feedstock comprises a size-reduced fiber feedstock.

3. A method according to claim 1, wherein the fragmented textile feedstock comprises a size-reduced carpet feedstock.

4. A method according to claim 1, wherein one or more fans operating at substantially constant speeds provide the upward airflow within the separation chamber.

5. A method according to claim 1, wherein the average air velocity within the separation chamber is more than about 500 feet per minute.

6. A method according to claim 1, wherein the average air velocity within the separation chamber is between about 1,000 and 3,000 feet per minute.

7. A method according to claim 1, wherein the step of continually assessing material contamination comprises continually measuring pre-separation metal contamination in the material feedstock.

8. A method according to claim 1, wherein the step of continually assessing material contamination comprises continually measuring post-separation metal contamination in the light fraction.

9. A method according to claim 1, wherein the step of continually assessing material contamination comprises continually measuring both pre-separation metal contamination and post-separation metal contamination.

10. A method according to claim 1, wherein the step of continually adjusting the airflow within the separation chamber comprises adjusting a controllable bleed valve in process-controlled response to the material contamination.

11. A process for removing metal contaminants from a fiber feedstock, comprising:
    providing a substantially vertical separation chamber having an upper light-fraction material outlet and a lower heavy-fraction material outlet;
    continually introducing a fiber feedstock into the separation chamber via an air stream that has an average velocity more than 500 feet per minute within the separation chamber;
    continually separating the fibers feedstock into (i) a light fraction that exits the separation chamber though the light-fraction material outlet and (ii) a heavy fraction that exits the separation chamber though the heavy-fraction material outlet;
    measuring metal contamination; and
    manipulating the air stream velocity within the separation chamber in response to the measured metal contamination.

12. A process according to claim 11, wherein the air stream has an average velocity of more than 1,000 feet per minute within the separation chamber.

13. A process according to claim 11, wherein the air stream has an average velocity of more than 2,000 feet per minute within the separation chamber.

14. A process according to claim 11, wherein the air stream has an average velocity of between about 1,000 and 3,000 feet per minute within the separation chamber.

15. A process according to claim 11, wherein the step of measuring metal contamination comprises measuring pre-separation metal contamination.

16. A process according to claim 11, wherein the step of measuring metal contamination comprises measuring post-separation metal contamination.

17. A process according to claim 16, wherein the step of measuring post-separation metal contamination comprises measuring metal contamination in the light fraction.

18. A process according to claim 11, wherein the air stream is provided by one or more fans operating at substantially constant speeds.

19. A process according to claim 18, wherein the step of manipulating the air stream velocity within the separation chamber comprises adjusting a controllable bleed valve in process-controlled response to the pre-separation metal contamination measured in the fiber feedstock.

20. A process according to claim 18, wherein the step of manipulating the air stream velocity within the separation chamber comprises adjusting a controllable bleed valve in process-controlled response to the post-separation metal contamination measured in the light fraction.

21. A process according to claim 11, wherein the step of manipulating the air stream velocity within the separation chamber comprises manipulating the air stream velocity within the separation chamber in process-controlled response to the measured metal contamination.

22. A process according to claim 11 that employs a feedback automatic process control system to maintain metal contamination in the light fraction near or below a set point.

23. A process according to claim 11 that employs a feed forward automatic process control system to maintain metal contamination in the light fraction near or below a set point.

24. A process according to claim 11, further comprising shredding and screening oversized waste to form a fiber feedstock prior to the step of introducing the fiber feedstock into the separation chamber.

25. A process according to claim 11, wherein the fiber feedstock is a polymer fiber feedstock; and further comprising forming the light fraction of the polymer fiber feedstock into an engineering resin.

26. A process according to claim 11, wherein the fiber feedstock is a polymer fiber feedstock; and further comprising forming the light fraction of the polymer fiber feedstock into filaments.

27. A process-controlled process for removing metal contaminants from a polymer fiber feedstock, comprising:

providing a substantially vertical separation chamber having an upper light-fraction material outlet and a lower heavy-fraction material outlet;

continuously introducing a polymer fiber feedstock into the separation chamber via an air stream that has an average velocity more than 500 feet per minute within the separation chamber;

continuously separating the polymer fiber feedstock into (i) a light fraction that exits the separation chamber though the light-fraction material outlet and (ii) a heavy fraction that exits the separation chamber though the heavy-fraction material outlet;

continuously measuring metal contamination in the light fraction;

transmitting, to a controller, measurement signals indicating the metal contamination in the light fraction;

transmitting, from the controller, control signals to a control element that manipulates air velocity within the separation chamber; and continually manipulating the air stream velocity within the separation chamber in process-controlled response to the control signals.

28. A process according to claim 27, wherein the air stream has an average velocity of more than 1,000 feet per minute within the separation chamber.

29. A process according to claim 27, wherein the air stream has an average velocity of more than 2,000 feet per minute within the separation chamber.

30. A process according to claim 27, wherein the air stream has an average velocity of between about 1,000 and 3,000 feet per minute within the separation chamber.

31. A process according to claim 27, further comprising the following steps, which occur after the step of transmitting measurement signals to a controller and prior to the step of transmitting control signals to a control element:

comparing the measured metal contamination in the light fraction with a set point; and deciding how to adjust the control element so as to maintain the metal contamination in the light fraction at or below the set point.

32. A process according to claim 27, wherein the air stream is provided by one or more fans operating at substantially constant speeds.

33. A process according to claim 32, wherein the step of continually manipulating the air stream velocity within the separation chamber comprises adjusting a controllable bleed valve.

34. A process according to claim 27, wherein the step of continually manipulating the air stream velocity within the separation chamber comprises adjusting a controllable bleed valve in process-controlled response to the control signals.

35. A process according to claim 27, further comprising:

continually measuring pre-separation metal contamination in the polymer fiber feedstock; and transmitting, to the controller, disturbance signals indicating metal contamination changes in the polymer fiber feedstock.

36. A process according to claim 27, further comprising shredding and screening oversized waste to form a polymer fiber feedstock prior to the step of continuously introducing the polymer fiber feedstock into the separation chamber.

37. A process according to claim 27, further comprising forming the light fraction of the polymer fiber feedstock into an engineering resin.

38. A process according to claim 27, further comprising forming the light fraction of the polymer fiber feedstock into filaments.

* * * * *

UNITED STATES PATENT AND TRADEMARK OFFICE
CERTIFICATE OF CORRECTION

PATENT NO. : 6,883,668 B1
DATED : April 26, 2005
INVENTOR(S) : Lindsey et al.

It is certified that error appears in the above-identified patent and that said Letters Patent is hereby corrected as shown below:

Column 8,
Line 39, "phototype" should read -- prototype --.

Column 11,
Line 66, after "material" delete ",".

Column 12,
Lines 7, 9, 53 and 55, "though" should read -- through --.

Column 14,
Lines 1 and 2, "though" should read -- through --.

Signed and Sealed this

Twenty-seventh Day of December, 2005

JON W. DUDAS
*Director of the United States Patent and Trademark Office*